(12) United States Patent
Mangione-Smith et al.

(10) Patent No.: US 8,473,818 B2
(45) Date of Patent: Jun. 25, 2013

(54) RELIABLE COMMUNICATIONS IN ON-CHIP NETWORKS

(75) Inventors: William H. Mangione-Smith, Kirkland, WA (US); Onur Mutlu, Pittsburgh, PA (US)

(73) Assignee: Empire Technology Development LLC, Wilmington, DE (US)

( * ) Notice: Subject to any disclaimer, the term of this patent is extended or adjusted under 35 U.S.C. 154(b) by 531 days.

(21) Appl. No.: 12/577,378

(22) Filed: Oct. 12, 2009

(65) Prior Publication Data

US 2011/0087943 A1      Apr. 14, 2011

(51) Int. Cl.
    H03M 13/00      (2006.01)
(52) U.S. Cl.
    USPC ........................................... 714/776
(58) Field of Classification Search
    USPC ................... 714/12, 27, 776; 712/27
    See application file for complete search history.

(56) References Cited

U.S. PATENT DOCUMENTS

| | | | | |
|---|---|---|---|---|
| 3,665,173 A | * | 5/1972 | Bouricius et al. | 714/11 |
| 4,965,717 A | * | 10/1990 | Cutts et al. | 714/12 |
| 5,193,175 A | * | 3/1993 | Cutts et al. | 714/11 |
| 5,239,641 A | * | 8/1993 | Horst | 713/375 |
| 5,295,258 A | * | 3/1994 | Jewett et al. | 714/12 |
| 5,317,726 A | * | 5/1994 | Horst | 714/12 |
| 5,353,436 A | * | 10/1994 | Horst | 713/375 |
| 5,379,415 A | * | 1/1995 | Papenberg et al. | 714/5.11 |
| 5,384,906 A | * | 1/1995 | Horst | 713/375 |
| 5,388,242 A | * | 2/1995 | Jewett | 711/113 |
| 5,454,095 A | * | 9/1995 | Kraemer et al. | 701/104 |
| 5,553,231 A | * | 9/1996 | Papenberg et al. | 714/5.11 |
| 5,574,849 A | * | 11/1996 | Sonnier et al. | 714/12 |
| 5,884,019 A | * | 3/1999 | Inaho | 714/6.1 |
| 5,890,003 A | * | 3/1999 | Cutts et al. | 710/263 |
| 6,144,848 A | * | 11/2000 | Walsh et al. | 455/419 |
| 6,233,702 B1 | * | 5/2001 | Horst et al. | 714/48 |
| 6,263,452 B1 | * | 7/2001 | Jewett et al. | 714/5.11 |
| 6,381,721 B1 | | 4/2002 | Warren | |
| 7,200,790 B2 | | 4/2007 | Sharma et al. | |
| 7,337,334 B2 | * | 2/2008 | Kuhlmann et al. | 713/300 |
| 7,839,777 B2 | * | 11/2010 | DeCusatis et al. | 370/230 |
| 7,991,735 B2 | * | 8/2011 | Fontanot | 707/610 |
| 2002/0049892 A1 | * | 4/2002 | Saulsbury et al. | 712/1 |
| 2002/0144177 A1 | * | 10/2002 | Kondo et al. | 714/13 |
| 2003/0097518 A1 | * | 5/2003 | Kohn et al. | 711/5 |
| 2005/0102572 A1 | * | 5/2005 | Oberlaender | 714/29 |
| 2005/0246578 A1 | * | 11/2005 | Bruckert et al. | 714/11 |

(Continued)

FOREIGN PATENT DOCUMENTS

WO        2007038529 A2      4/2007

OTHER PUBLICATIONS

U.S. Patent Office; International Search Report and the Written Opinion in related PCT application (PCT/US2010/036613) which claims priority to the present application; Aug. 23, 2010.

(Continued)

*Primary Examiner* — Joshua P Lottich
*Assistant Examiner* — Jeison C Arcos
(74) *Attorney, Agent, or Firm* — Maschoff Brennan

(57) ABSTRACT

Techniques for reliable communication in an on-chip network of a multi-core processor are provided. Packets are tagged with tags that define reliability requirements for the packets. The packets are routed in accordance with the reliability requirements. The reliability requirements and routing using them can ensure reliable communication in the on-chip network.

25 Claims, 5 Drawing Sheets

U.S. PATENT DOCUMENTS

| | | | |
|---|---|---|---|
| 2006/0242456 A1* | 10/2006 | Kondo et al. | 714/6 |
| 2007/0130445 A1* | 6/2007 | Lau et al. | 712/11 |
| 2007/0239966 A1 | 10/2007 | Georgiou et al. | |
| 2008/0147951 A1 | 6/2008 | Love | |
| 2008/0184008 A1 | 7/2008 | Zhu et al. | |
| 2008/0282005 A1 | 11/2008 | Chencinski et al. | |
| 2009/0059916 A1* | 3/2009 | DeCusatis et al. | 370/389 |
| 2009/0088924 A1 | 4/2009 | Coffee et al. | |
| 2009/0109996 A1 | 4/2009 | Hoover et al. | |
| 2009/0313489 A1* | 12/2009 | Gunther et al. | 713/300 |
| 2010/0325388 A1* | 12/2010 | Howard | 712/29 |

OTHER PUBLICATIONS

M. Sgroi, et al "Addressing the System-on-a-Chip Interconnect Woes Through Communication-Based Design" Online: http://bwrc.eecs.berkeley.edu/php/pubs/pubs.php/342/p134.pdf, DAC 2001, pp. 667-672.

William J. Dally, et al "Route Packets, Not Wires: On-Chip Interconnection Networks" Online: http://cva.stanford.edu/publications/2001/onchip_dac01.pdf DAC, 2001, pp. 684-689.

Jon Stokes "MIT startup raises multicore bar with new 64-core CPU" Online: http://arstechnica.com/hardware/news/2007/08/MIT-startup-raises-multicore-bar-with-new-64-core-CPU.ars.

Dan Ernst, et al "Razor: Circuit-Level Correction of Timing Errors for Low-Power Operation" Online: http://www.eecs.umich.edu/~taustin/papers/IEEEMICRO05-Razor.pdf, IEEE MICRO special issue on Top Picks from Microarchitecture Conferences of 2004, Mar. 2005, pp. 10-20.

Shekhar Borkar "Thousand Core Chips—A Technology Perspective" Online: http://www.google.com/url?sa=t&source=web&ct=res&cd=1&ved=0CAcQFjAA&url=http%3A%2F%2Fvideos.dac.com%2F44th%2Fpapers%2F42_1.pdf&ei=hNfESt33GILOtAOWzbSkCg&usg=AFQjCNH251OjHQgkaLRBesVj20piW-nlKw, DAC-44, 2007, pp. 746-749.

Bircher, W.L., and John, L.K., "Analysis of Dynamic Power Management on Multi-Core Processors," International conference on Supercomputing, pp. 327-338, ACM (2008).

Kaul, H., et al., "DVS for On-Chip Bus Designs Based on Timing Error Correction," Design Automation and Test in Europe, vol. 1, pp. 80-85, IEEE Computer Society (2005).

Qu, G., "Power Management of Multicore Multiple Voltage Embedded Systems by Task Scheduling," International Conference on Parallel Processing Workshops, pp. 6, IEEE Computer Society (2007).

Waldschmidt, K., et al., "Reliability-Aware Power Management Of Multi-Core Systems (MPSoCs)," in Dagstuhl Seminar Proceedings, pp. 1-7 (2006).

* cited by examiner

RELIABLE COMMUNICATIONS IN ON-CHIP NETWORKS

BACKGROUND

The design and architecture of very large scale integrated (VLSI) circuits such as processors are quite complicated. It is generally recognized that performance is often sacrificed in order to ensure reliable operation of the processor. With the development of multi-core processors, the ability to reliably deliver data becomes a bigger concern.

The development of multi-core processors leads to additional connections and structural complexity. Links between cores may lengthen and the propagation time for voltage levels typically increases. In addition, the proliferation of components in multi-core processors, the smaller size and increased density of transistors makes it likely, for example, that on-chip switches and links will fail either intermittently or permanently. As a result, the ability to deliver data in the on-chip network of the multi-core processor becomes less reliable.

At the same time, there are many applications where reliable communication is a requirement. Parallelized applications, which are distributed to and performed by multiple cores, often rely on the tasks being performed by those cores to finish before moving forward. When communication fails in the on-chip network, the system or application may hang or otherwise fail.

The ability to reliably communicate between cores is an important concern in multi-core processor design. As previously stated, however, the development of a highly reliable processor likely sacrifices performance and likely increases cost. In order to improve performance, applications operating on multi-core processors face the prospect of achieving reliable communication on a relatively unreliable on-chip network.

DETAILED DESCRIPTION

Figure 1:
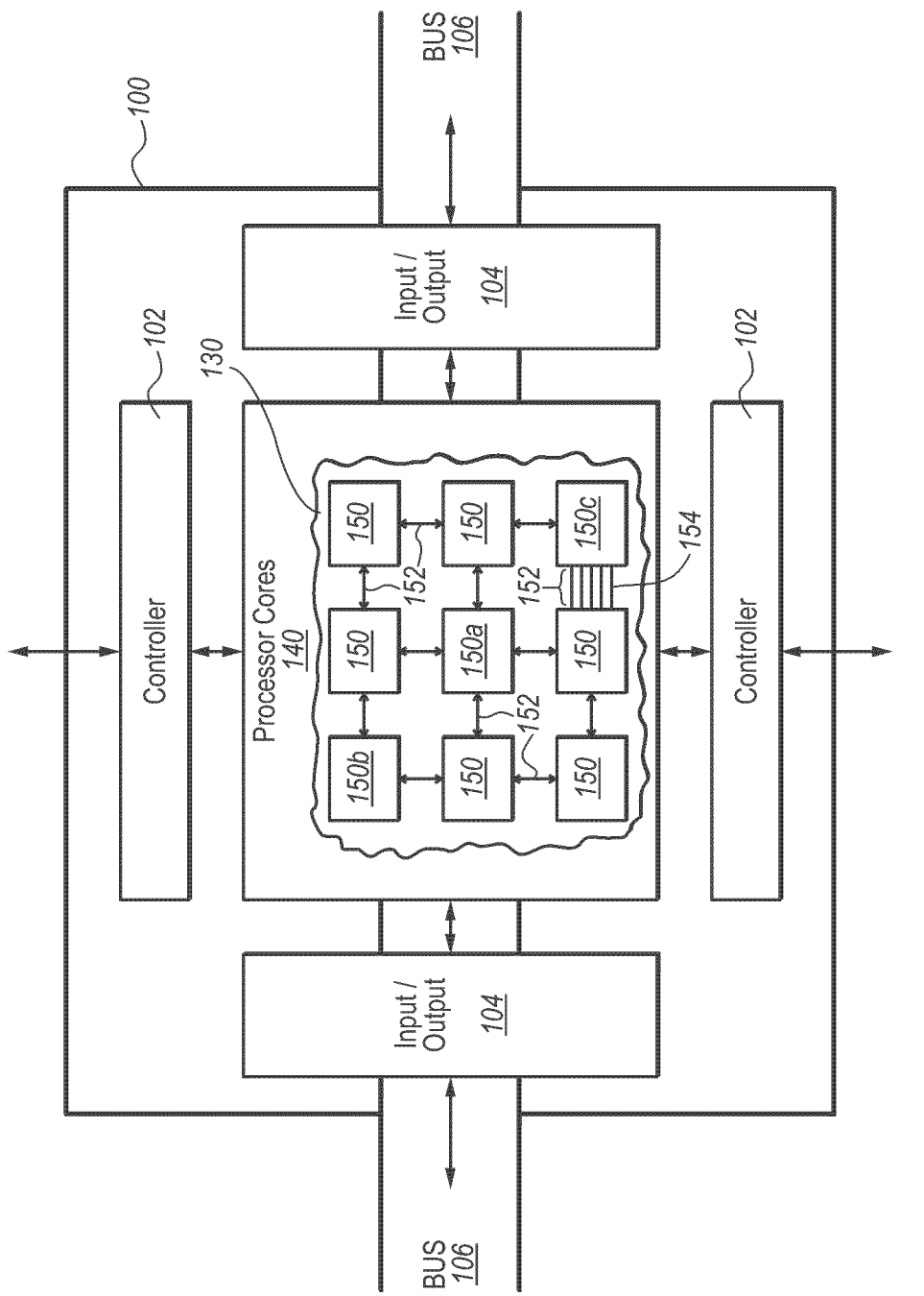
FIG. 1 shows an illustrative embodiment of a multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments described herein relate to providing reliable communications in on-chip networks. Reliable communication can be achieved by associating reliability requirements with packets transmitted in the on-chip network. Reliability requirements can be associated with packets, for example, using tags that define reliability requirements for the packets. The reliability requirements associated with the tag can be interpreted before, during, and/or after transmission and implemented before, during, and/or after transmission.

Alternatively or in addition to the tag, reliability requirements can also include settings of the cores or other components in the on-chip network of a multi-core processor. The settings can be altered, dynamically in some instances, in accordance with the reliability requirement of a packet or set to achieve the reliability requirement. The performance of on-chip communications can be dynamically adapted as packets are transmitted in the on-chip network using the tag and/or the settings to achieve a desired level of performance for packet delivery.

FIG. 1 shows an illustrative embodiment of a multi-core processor 100, which may be included in a computer or other computing device and that is configured to provide reliable communication within the multi-core processor 100. The multi-core processor 100 can be used in computers and other devices for processing purposes. The multi-core processor 100 is responsible for operating or executing software or other executable instructions that have been loaded, stored, or otherwise made accessible to the computer.

The multi-core processor 100 illustrated in FIG. 1 is a multi-core processor and includes processor cores 140. The processor cores 140 execute instructions, perform calculations, and otherwise provide the computing and processing capability a computer or computer system. The processor cores 140 can communicate with other modules or components in a computer via an input/output module 104. The input/output modules 104 can receive/transmit data that is often carried out over a system bus 106 and connect to other components of a computing system. The input/output modules 104 can be configured or are capable of operating in accordance with multiple protocols including, but not limited to, Gigabit Ethernet, XAUI, PCIe, JTAG, TWI, or the like and may provide serializing/deserializing of a data stream, asynchronous transmission, or the like.

The input/output modules 104 may include separate modules, which may be configurable, for each protocol. The input/output modules 104 may enable the multi-core processor 100 or the computer to communicate with other computers over networks such as a local area network, the Internet, or the like. For example, a server computer having the multi-core processor 100 may communicate with a client computer over a network. In the preceding example, the client computer may or may not have the multi-core processor 100.

The multi-core processor 104 also includes controllers 102. The controllers 102, which may include multiple controllers 102, may provide access to system memory such as various cache levels, RAM, or the like or any combination thereof. Of course, each of the processor cores 140 may include its own cache as well. One of skill in the art can appreciate that the multi-core processor 100 may include other modules (e.g., instruction decoders, bus interface unit, address generator, floating point units, integer execution units, registers, etc.).

Further, the multi-core processor 100 may be integrated into a single chip. Alternatively, some of the modules or components of the multi-core processor 100 may be in separate chips that interact with each other.

FIG. 1 also illustrates a more detailed view of the processor cores 140 in the multi-core processor 100. The processor cores 140 are configured to communicate via an on-chip network 130. The processor cores 140 and, in particular, the on-chip network 130 includes multiple individual cores 150, which include a core 150a, a core 150b, and a core 150c. Depending on context, reference to or description of the core 150 is applicable to each of the cores 150a, 150b, and 150c. Similarly, any reference to or description of the cores 150a, 150b, and 150c may also be equally applicable to the other cores 150 in accordance with context.

Each core 150 is generally the same, although there may be instances where some of the cores 150 differ structurally from other cores. For example, some of the cores 150 may interface with the input/output modules 104 or the controller 102, directly while some of the cores may communicate with these modules through other cores. Some of the cores may have more processing capabilities or power than others. The core 150a, which is included in the cores 150 and located in the interior of the processor cores 140 in this example, may communicate with modules or components through other cores 150, although one of skill in the art can appreciate that direct communication may also be possible.

The cores 150 can be arranged in different configurations or topologies. Mesh topologies, torus topologies, or fat tree topologies are examples of core topologies that may be used in the multi-core processor 100.

Each core 150 includes a processor that can function independently of other cores in the processor cores 140. Each core 150 can typically execute computer program on its own if necessary. One advantage of the multi-core processor 100 is that the cores 150 can work collectively to perform an application or execute instructions, etc.

When collectively executing an application, the cores 150 may have different responsibilities within the application being executed. As a result, the multi-core processor 100 is able to execute an application more quickly than when processing the same application with a single core or compared to a single-core processor. In addition, the cores 150 can operate on different applications or processes in a computing system at the same time. This allows, for example, some of the cores 150 to perform one application, while other cores 150 perform or execute other applications or processes. In addition, the cores 150 can also switch between application processes. Thus, a specific core such as the core 150a may perform multiple processes for one or more applications.

When executing a process or application in the multi-core environment such as illustrated by the processor cores 140, there is often a need for data (e.g., application data, addresses, instructions, etc.) to be transferred from one of the cores 150 to another of the cores 150 (e.g., from the core 150b to the core 150c). This may often be achieved using the on-chip network 130, which includes the connections 152.

In FIG. 1, the connections 152 are used to connect the cores 150 to each other. While all of the cores 150 may not be directly connected to each other (e.g., the core 150b may not be directly connected to the core 150a), the connections 152 ensure that any of the cores 150 can communicate with any other of the cores 150.

For example, when the cores 150 are arranged in a grid configuration, the cores 150 may have connections 152 in up, right, left, and down directions. In this example, each connection 152 may include multiple channels 154. The channels 154 may include the physical connections between the cores 150. In this example, multiple channels may exist between directly connected cores 150.

Figure 2:
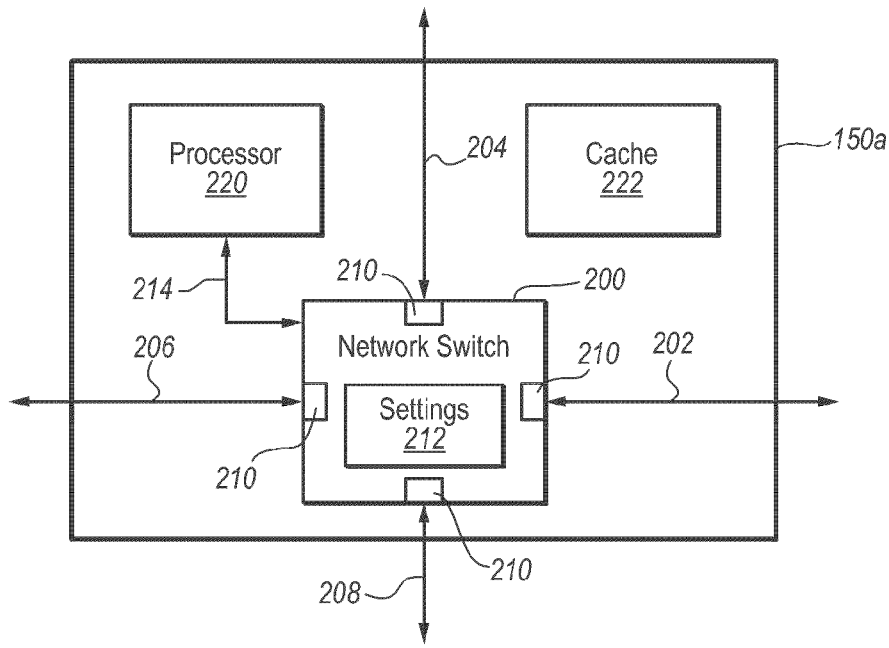
FIG. 2 shows a block diagram of an illustrative embodiment of a core included in the multi-core processor.

FIG. 2 shows a block diagram of an illustrative embodiment of the core 150a included in the multi-core processor 100. The core 150a is one of the processor cores 140. The ability to deliver or transfer data using the connections 152 is achieved by providing each of the cores 150 with a network switch 200, as illustrated by the network switch 200 in the core 150a in FIG. 2. The core 150a includes a processor 220, a cache 222, and the network switch 200. The network switch 200 may be connected to adjacent network switches with a connection 202, a connection 204, a connection 206, and a connection 208, which are examples of the connections 152. As previously described, each of the connections 152, which includes the connections 202, 204, 206, and 208, typically includes multiple channels. As a result, the core 150a is able to communicate with adjacent or directly connected cores 150 via multiple channels.

The network switch 200 interfaces with the connections 202, 204, 206, and 208 through ports 210. More specifically, the channels represented by each of the connections 202, 204, 206, and 208 are connected to specific ports included in the ports 210. In the illustrated example, the core 150a has direct connections to four other cores. Each connection may include, by way of example only, five channels. Each of the connections 202, 204, 206, and 208 may include more or fewer channels as well. In addition, the network switch 200 may be connected to the processor 220 via channels 214. The channels 214 may be used for communication between the processor 220 and the network switch 200. For example, packets to be processed by the core 150a may be transferred to the core 150a via the channels 214.

The core 150a also includes the cache 222. The cache 222 may be specific to the core 150a (e.g., the cache 222 may be L1 and L2 cache for the processor 220) or may be shared with other ports 150. Alternatively, the cache 222 may be included in the network switch 200 or accessible to the network switch 200 as well. Alternatively, the network switch 200 may have a controller and a cache that enable the network switch 200 to perform routing functions.

The network switch 200 also includes settings 212. The settings 212 may be used to control some of the operational aspects of the network switch 200. For example, the settings 212 may be used to control voltage levels of the network switch 200, clock speeds of the network switch 200, pipeline controls, or the like. The settings 212 may also be used to control operational aspects of the processor 220 in some instances.

The desired performance of the core 150a or of the network switch 200 can be achieved by dynamically adjusting the settings 212. For example, increasing the clock speed can increase throughput, while lowering voltage levels can conserve power. The settings 212 can be used to adjust voltage levels, clock speed, or the like to dynamically change the performance of the network switch 200, or of the core 150a.

Figure 3:
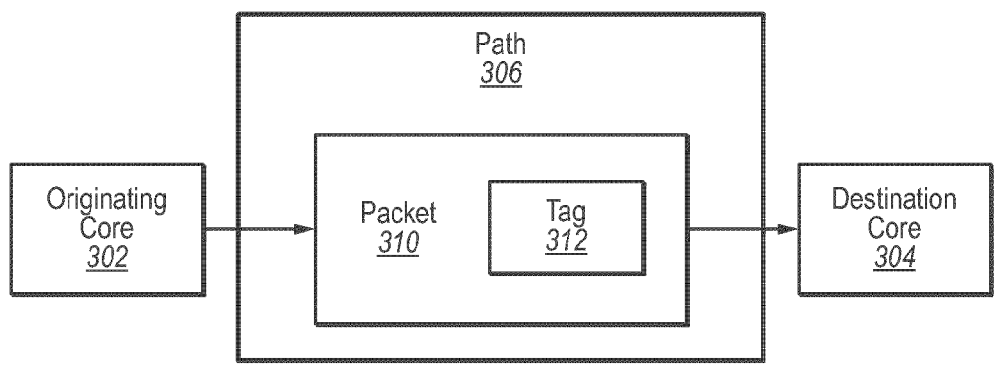
FIG. 3 shows a path of a packet with reliability requirements from an originating core to a destination core in the multi-core processor.

FIG. 3 shows a path 306 of a packet 310 with reliability requirements from an originating core 302 to a destination core 304 in the multi-core processor 100. In the example illustrated in FIG. 3, the originating core 302 (which may be one of the cores 150) is transmitting the packet 310 to the destination core 304 (which may also be one of the cores 150). The packet 310 is transmitted over the path 306, which may (i) be direct between the originating core 302 and the destination core 304 or (ii) include one or more hops through other cores 150 in the multi-core processor 100. Further, the packet 310 is intended to represent different types of data as well as multiple packets of data. For example, the packet 310 may represent application data, streaming packets, instructions, addresses, other data, control messages, or the like or any combination thereof. The reliability requirements can be applied to the packet 310, a stream of packets, at least one packet in a stream, all packets from a stream of packets in an application, all packets associated with the application, all packets from the originating core, or the like.

The path 306 can be determined dynamically while the packet 310 is in transit where the path 306 is unknown and where the next node or hop in the path 306 is determined at each core 150. The next node of hop in the path 306 may be determined at the current network switch 200 in real-time or in quasi real-time. The destination core may be known, but the path 306 to the destination core may not be known and is determined while the packet 310 is in transit.

Alternatively, the path 306 may be predetermined and established as a virtual path prior to transmission of the packet 310.

The packet 310 includes a tag 312. The tag 312 can be added to the packet 310 as a way to identify at least one reliability requirement for the packet 310. Alternatively, the tag 312 can be separate from (i.e., not included as part of) the packet 310. For example, if the packet 310 must be delivered to the destination core 304, the tag 312 indicates this requirement (e.g., delivery confirmation) for the packet 310. The tag 312 can be used to insure that the delivery of the packet 310 is reliable even when the underlying on-chip network may be less reliable.

In another example, the tag 312 may specify that the packet 310 should be delivered in a specified time period. The transit time of the packet 310 can be updated and evaluated at each node. If the specified time period expires before the packet 310 is delivered, then it may be dropped or a failure message may be returned to the originating core.

In another example, the tag 312 may specify that a copy of the packet is to be cached or buffered at one of the cores 150 until the packet 310 is delivered. The tag 312 may also specify the settings 212 that may be used by the network switch 200. The tag 312 can be used to enhance the reliability of the network switch 200 by slowing the clock rate or increasing voltage and thus improve the reliability of the transfer of packet 310.

In another example, the tag 312 may request that each core in the path 306 confirm to the preceding core the successful delivery of the packet 310 to the next or succeeding core in the path 306. Alternatively, this may be achieved by causing the destination core 304 to send a received notice back to the originating core 302 or to another core in the path 306. Also, the tag in 312 can be used to set up a circuit in the network that the packet should flow through in order to avoid unreliable links and routers in the network.

These examples illustrate that the tag 312 can specify a desired level of reliability that can overcome instances where the on-chip network 130 or cores 150 are unreliable.

The reliability requirement specified or defined in the tag 312 of the packet 310 can be expressed in various ways. For example, the tag 312 may indicate that the packet 310 should be delivered within a predetermined time period. The tag 312 can be evaluated at any core in the path 306. If the reliability requirement in the tag 312 cannot be satisfied, then transmission may be abandoned (or aborted) and/or another action or operation, which may also be identified in the tag 312 can be performed. For instance, the originating core 302 may be advised that the packet 310 was not delivered to the destination core 304 or that it was dropped. Other actions that may occur when the reliability requirement is not or cannot be satisfied include cancelling delivery of the packet, replacing the packet with an updated packet, or the like.

In another example, the reliability requirements in the tag 312 may simply require notification of delivery to the destination node 304 without regard to the path 306 or time elements. The tag 312 may indicate that the packet 310 follow a predetermined path—such as a virtual path that has been previously established. The tag 312 may also be used to identify reliability requirements for subsequent packets. In a stream of packets, for example, the reliability requirements for all of the packets in the stream can be specified or defined in the tag 312, which may be attached to a subset of the packets in the stream of packets. In this case, the tag 312 can be applied to multiple packets without actually including the tag 312 in all of the packets.

In another example, the tag 312 may specify an acceptable error rate for transmission of the packet 310 (or a group of packets). Video data, for example, can be successfully delivered even when some of the packets are not delivered. Audio data, on the other hand is more noticeably affected by data loss. As a result, the reliability requirements for audio data may differ from the reliability requirements for video data.

The tag 312 may also express the reliability requirement in terms of time. The tag 312 may express that the packet 310 should be delivered within a certain time period. This can be checked at each core in the path 306 and/or updated in each core.

These examples illustrate that the tag 312 can define the reliability requirements in terms of data type, request type, error percentage rate, acceptable error rate, delivery time periods, path identification, actions taken on delivery time period expiration, application priority, user input, or the like or any combination thereof.

The tag 312 can be represented by a bit or a set of bits in the packet 310, or included in a header of the packet 310, or other schema. The bit or header, for example, can indicate whether reliable transport of the packet 310 is required. The set of bits can be used to identify specific levels or to identify specific reliability requirements for the packet 310. In addition, the tag 312 can be set by an application, by an operating system, by a core, or by a virtual machine monitor. The origination of the reliability requirements defined by the tag 312 can thus vary according to circumstance. For example, there may be instances where the operating system can set the reliability requirements independently of the application or contrary to the application.

Figure 4:
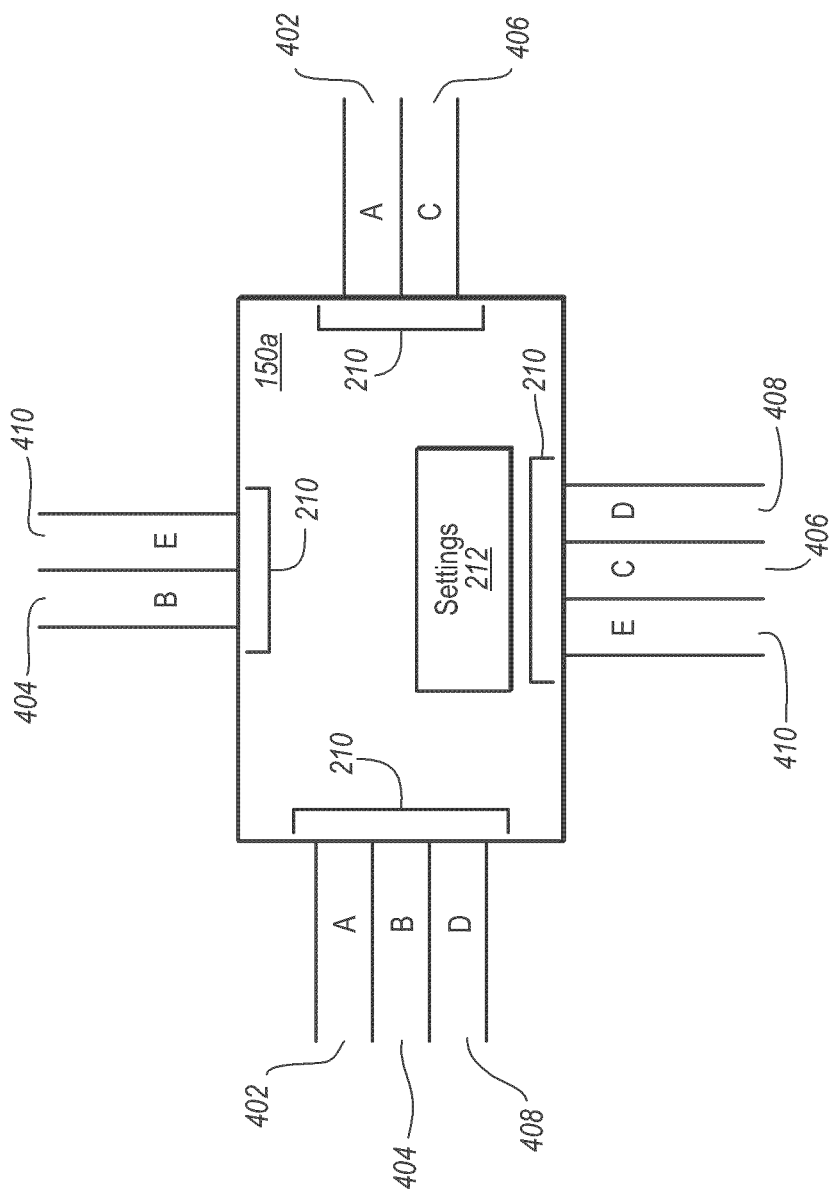
FIG. 4 shows a block diagram of an illustrative embodiment of a core and of the core's settings that can be dynamically adapted according to the reliability requirement of paths that include the core or according to the reliability requirement of data received/transmitted by the core.

FIG. 4 shows a block diagram of an illustrative embodiment of the core 150a and of the core's settings (including the network switch's settings) that can be dynamically adapted according to the reliability requirement of packets that follow paths that include the core 150a or according to the reliability requirement of packets received/transmitted by the core 150a. FIG. 4 illustrates the dynamic adjustment of the performance of the on-chip network 130 of the multi-core processor 100. The performance of the core 150a, including the network switch 200, can be altered by changing the settings 212.

FIG. 4 illustrates an example of establishing the settings 212 according to reliability requirements. In FIG. 4, some of the channels that connect to the ports 210 are illustrated. In this example, these ports and corresponding channels have been set up as virtual paths 402, 404, 406, and 408.

Because the core 150a is currently set up for the virtual paths 402, 404, 406, 408, and 410 the settings 212 may be determined according to the path whose reliability requirements may be the highest or may indicate the most reliability. For example, packets transmitted in the virtual path 402 may be able to tolerate a certain percentage of data loss while the virtual path 404 may not be able to tolerate data loss or may tolerate a lower percentage of data loss. As a result, the settings 212 of the core 150a may be set to accommodate the reliability requirements for the virtual path 404.

The settings 212 can be set to alter the performance of the multi-core processor 100. The settings 212 may also be used to select switching speeds of the network switch 200, clock rate, voltage levels, or the like. For example, while increasing the clock rate may lead to an error rate in data transmission, the error rate may be acceptable in certain circumstances. Similarly, altering the voltage level may have an impact on the error rate. In exchange for a slight increase in transient failures, the settings 212 can be adjusted to increase the clock rate or to reduce operating voltage to conserve power. The reliability requirements associated with the tag 312 can be used to set the settings 212 or set other delivery requirements on the packet 310 in order to provide a desired level of reliability even when the on-chip network may experience transient failures or otherwise be unreliable. The tag 312 can identify or specify certain settings 212 in accordance with the reliability requirements.

Figure 5:
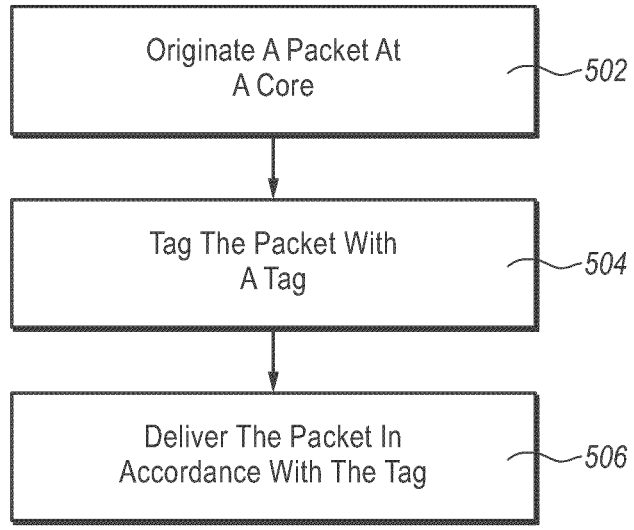
FIG. 5 shows a flow diagram of an illustrative embodiment of a method for routing a packet in an on-chip network.

FIG. 5 shows a flow diagram of an illustrative embodiment of a method for routing a packet in an on-chip network. In block 502, a core may originate a packet to be transmitted in the on-chip network. At block 504, the packet is tagged with the tag by the core, the operating system, or other component. The tag can specify or define reliability requirements related to the delivery and/or transmission of the packet. In block 506, the packet is delivered in accordance with the reliability requirements defined by the tag. The packet is delivered by the originating core to another core. Each core in the path may evaluate the tag and act according to the reliability requirements specified therein. Finally, the packet is delivered to the destination core.

Thus, the packet may be routed with a desired level of reliability that is reflected in the tag. As previously described, the desired level of reliability can be achieved in accordance with the tag.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
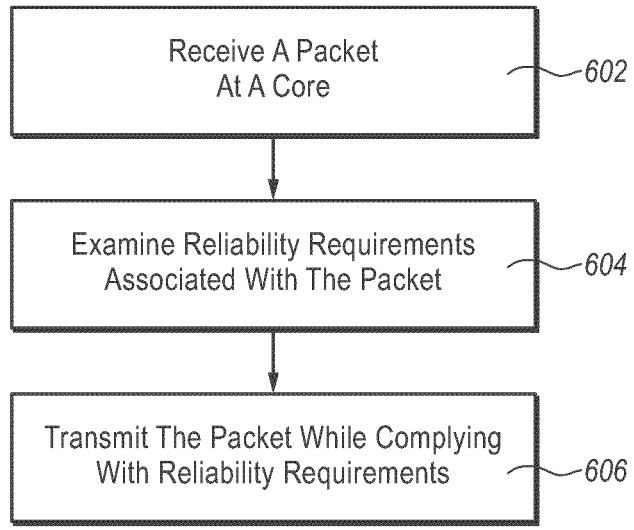
FIG. 6 shows a flow diagram of an illustrative embodiment of a method for routing a packet in the on-chip network of a multi-core processor.

FIG. 6 shows a flow diagram of an illustrative embodiment of a method for routing a packet in the on-chip network of a multi-core processor. In block 602, the packet is received at a core of the multi-core processor. In block 604, the core or a component thereof examines the reliability requirement associated with the packet. As previously described, the reliability requirement is typically defined of specified in the tag that may accompany the packet. In block 606, the core may then transmit the packet in compliance with the reliability requirement. This may include, as previously mentioned by way of example only, altering the settings of the core or of components included in the core, storing the packet in the core's cache until delivery is confirmed, sending a confirmation delivery message, which may be confirmation of receipt of the packet, or a delivery failure message, or the like or any combination thereof. In some instances, the reliability requirement may be implemented before the packet is transmitted. For example, when the settings are changed, cores in the path may be notified before they begin receiving the packet.

Additionally, responding to a delivery failure can be managed using an application programming interface (API). This can allow the application to manage the delivery failure of the packet. For example, an application may determine that the packet is too old and cancel the delivery according to the age of the packet or according to an expiration time or expiration period of the packet. Alternatively, the application may send out a replacement packet or resend the packet. The application itself can determine when the replacement or resend packet is sent.

The API may also have access to a record of packet delivery failures that happened in the past. This record can be accessed over time, for a specific application, or the like. This record may allow the application, or the processing core or the operating system, to determine the reliability requirements of future packets. The record can also be used to adjust the mapping of different tasks to different switches or cores in the on-chip network. This may allow the performance to be improved using different settings. For example, the record may determine that certain switches can operate at higher clock rates while complying with the reliability requirement than other switches or cores. Mapping tasks or requesting that packet routing use certain cores and/or switches can thus improve performance. These tasks can be implemented in the memory of the multi-core processor 100, in the application or in the operating system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Figure 7:
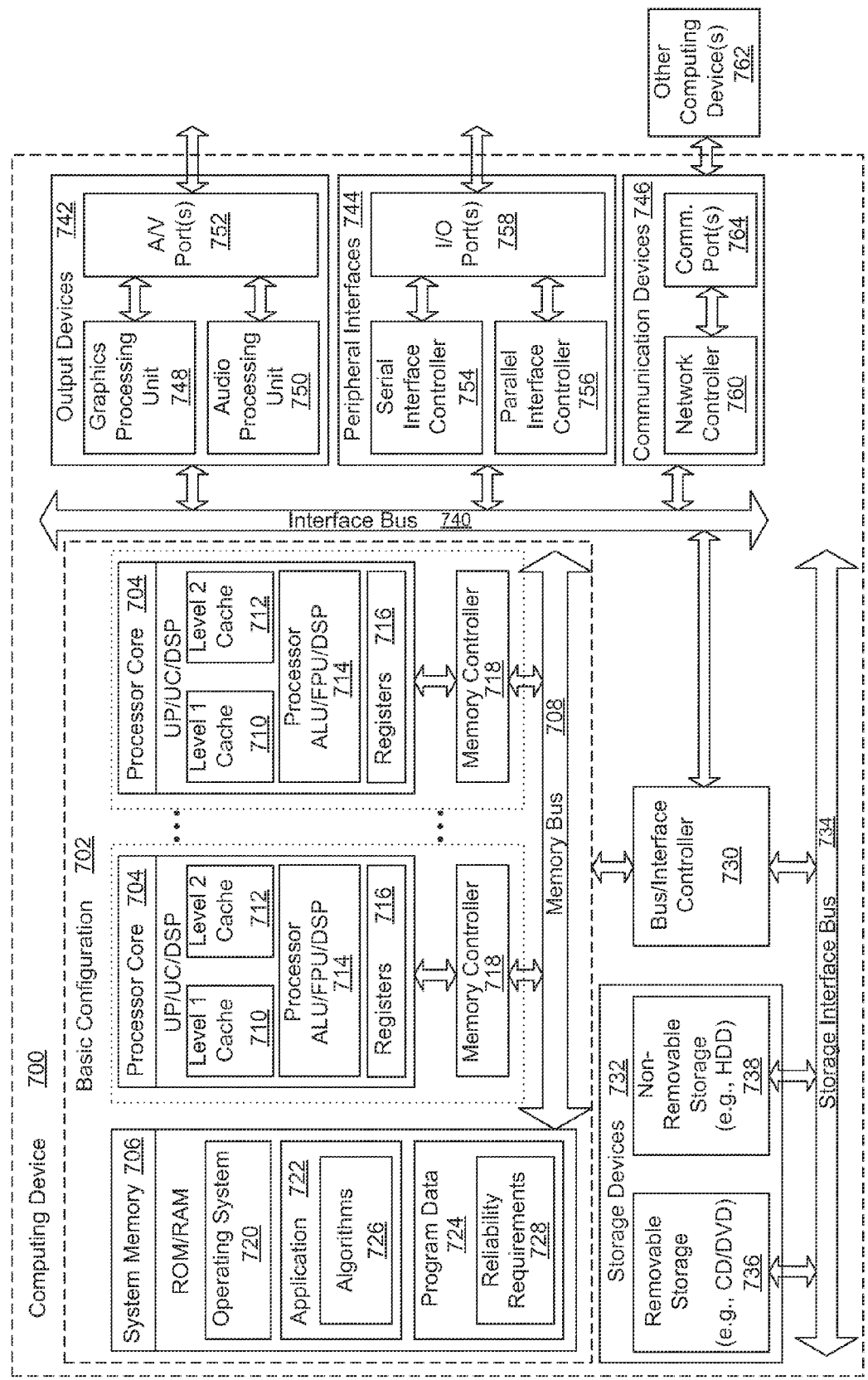
FIG. 7 shows an example computing device that includes a multi-core processor.

FIG. 7 is a block diagram illustrating an example computing device 700 that is arranged for reliable communication over the on-chip networks in multi-core processor in accordance with the present disclosure. In a very basic configuration 702, computing device 700 typically includes one or more cores 704 and a system memory 706. A memory bus 708 may be used for communicating between the cores 704 and system memory 706.

Depending on the desired configuration, each of the cores 704 may be of any type including but not limited to a microprocessor (μP), a microcontroller (μC), a digital signal processor (DSP), or any combination thereof. Cores 704 may include one more levels of caching, such as a level one cache 710 and a level two cache 712, a processor 714, and registers 716. An example processor 714 may include an arithmetic logic unit (ALU), a floating point unit (FPU), a digital signal processing core (DSP Core), or any combination thereof. An example memory controller 718 may also be used with cores 704, or in some implementations memory controller 718 may be an internal part of cores 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include algorithms 726 that are arranged to reliably route and deliver packets in the on-chip network of a multi-core processor. Program data 724 may include or define reliability requirements 728 that may be useful for reliably transmitting packets in the on-chip network as will be further described below. In some embodiments, application 722 may be arranged to operate with program data 724 on operating system 720 such that the packets are delivered in accordance with the reliability requirements even when the underlying on-chip network may be unreliable. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics multi-core processor 748 and an audio multi-core processor 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. In a multi-core processor having a switch fabric providing communication among a plurality of cores, a method for delivering a packet in the switch fabric, the method comprising:
   originating the packet at an originating core included in the plurality of cores, the core including a processor and a network switch, wherein the plurality of cores are the nodes in the switch fabric;
   tagging the packet with a tag included as part of the packet, wherein the tag defines a reliability requirement for the packet, wherein the reliability requirement controls delivery of the packet in the switch fabric; and
   delivering the packet to a destination core in compliance with the reliability requirement, wherein the reliability requirement enables the switch fabric to dynamically adjust performance of the switch fabric in the delivery of the packet.

2. The method of claim 1, wherein the reliability requirement includes a bit indicating whether reliable transport is required for the packet in the switch fabric.

3. The method of claim 2, wherein the bit is set by at least one of an application, an operating system, the switch, a processor, or a virtual machine monitor.

4. The method of claim 1, wherein the reliability requirement is applied to at least one of the packets, all packets from a stream of packets in an application, all packets associated with the application, or all packets from the originating core.

5. The method of claim 1, further comprising resending the packet when the packet fails to be delivered to the destination core.

6. The method of claim 5, further comprising resending the packet by at least one of a network switch, a core, or a plurality of network switches and cores in cooperation.

7. The method of claim 1, further comprising responding to a packet failure with an application through an interface with the core.

8. The method of claim 7, further comprising cancelling delivery of the packet according to an age of the packet.

9. The method of claim 8, further comprising replacing the packet with an updated packet.

10. The method of claim 6, wherein a packet failure is asynchronous such that threads can work on other tasks in the multi-core processor and also respond to the packet failure.

11. The method of claim 1, further comprising storing a record of packet delivery failures, wherein the record is used to determine reliability requirements for subsequent packets.

12. A method for routing a packet in a switch fabric, the method comprising:
   receiving a packet at a core of a multi-core processor from an originating core, the core including at least a processor and a network switch for routing packets and the packet including a tag as part of the packet;
   examining a reliability requirement defined by the tag, wherein the reliability requirement identifies delivery options for the packet in the switch fabric; and
   transmitting the packet in the switch fabric to a destination core while complying with the reliability requirement defined by the tag, wherein the core, the originating core and the destination core are part of the nodes in the switch fabric.

13. The method of claim 12, wherein examining a reliability requirement associated with the packet further comprises complying with the reliability requirement.

14. The method of claim 13, wherein the reliability requirement requires storing the packet in a buffer of the core until receipt of the packet is confirmed.

15. The method of claim 13, wherein the reliability requirement requires requesting that the packet be resent in the event of packet failure.

16. The method of claim 12, wherein the reliability requirement requires confirmation of receipt of the packet before transmitting subsequent packets.

17. The method of claim 12, further comprising cancelling the packet according to an age of the packet in the event of packet failure.

18. The method of claim 12, further comprising replacing the packet with an updated packet in the event of packet failure.

19. The method of claim 12, further comprising:
   storing data associated with packet failures in the switch fabric; and
   adjusting the reliability requirement of subsequent packets based on the data.

20. The method of claim 19, wherein adjusting the reliability requirement comprises mapping delivery tasks to specific cores in the multi-core processor via the switch fabric.

21. A multi-core processor having a switch fabric for routing a packet, the processor comprising:
   a plurality of connections;
   a plurality of cores connected by the plurality of connections to form the switch fabric, the plurality of cores including an originating core and a destination core, each core including a processor and a network switch, wherein the originating core generates the packet and tags the packet with a tag included as part of the packet, wherein the tag defines a reliability requirement, wherein the packet is delivered to the destination core via the switch fabric according to the reliability requirement, wherein the plurality of cores are the nodes in the switch fabric.

22. The processing device of claim 21, wherein at least one of the originating core, the destination core, or a core in a delivery path of the packet changes settings of the network switch, wherein the settings are defined in the reliability requirement.

23. The processing device of claim 22, wherein the settings include at least one of a clock speed for the network switch or a voltage level for the network switch.

24. The processing device of claim 21, wherein each core in a delivery path of the packet in the switch fabric from the originating core to the destination core evaluates the reliability requirement for compliance.

25. The processing device of claim 24, further comprising storing the packet in a cache of at least one core in the delivery path.

\* \* \* \* \*

UNITED STATES PATENT AND TRADEMARK OFFICE
CERTIFICATE OF CORRECTION

PATENT NO. : 8,473,818 B2
APPLICATION NO. : 12/577378
DATED : June 25, 2013
INVENTOR(S) : Mangione-Smith et al.

It is certified that error appears in the above-identified patent and that said Letters Patent is hereby corrected as shown below:

On Title Page 2, in Item (56), under "OTHER PUBLICATIONS", in Column 1, Line 1, delete "al" and insert -- al., --, therefor.

On Title Page 2, in Item (56), under "OTHER PUBLICATIONS", in Column 1, Line 5, delete "al" and insert -- al., --, therefor.

On Title Page 2, in Item (56), under "OTHER PUBLICATIONS", in Column 2, Line 1, delete "al" and insert -- al., --, therefor.

In the Drawings

In Fig. 7, Sheet 5 of 5, delete " 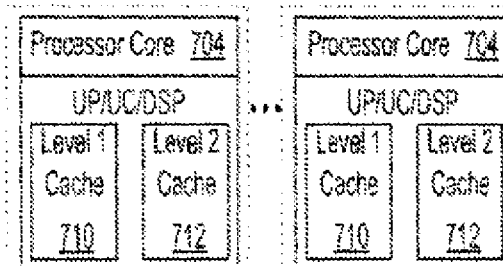 " and insert -- 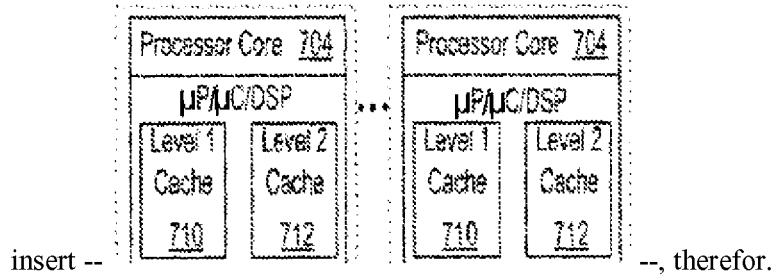 --, therefor.

In the Specification

In Column 4, Line 41, delete "ports 150." and insert -- cores 150. --, therefor.

Signed and Sealed this
Nineteenth Day of November, 2013

Teresa Stanek Rea
*Deputy Director of the United States Patent and Trademark Office*

CERTIFICATE OF CORRECTION (continued)
U.S. Pat. No. 8,473,818 B2

In Column 5, Line 55, delete "avid" and insert -- avoid --, therefor.

In Column 6, Line 9, delete "node 304" and insert -- core 304 --, therefor.

In Column 9, Line 33, delete "(HDD)," and insert -- (HDDs), --, therefor.

In Column 9, Line 35, delete "(SSD)," and insert -- (SSDs), --, therefor.

In Column 9, Line 45, delete "(DVD)" and insert -- (DVDs) --, therefor.